June 6, 1933. G. H. HARTMAN 1,912,770
LUBRICANT FITTING CLAMP
Filed Sept. 14, 1931 2 Sheets-Sheet 1
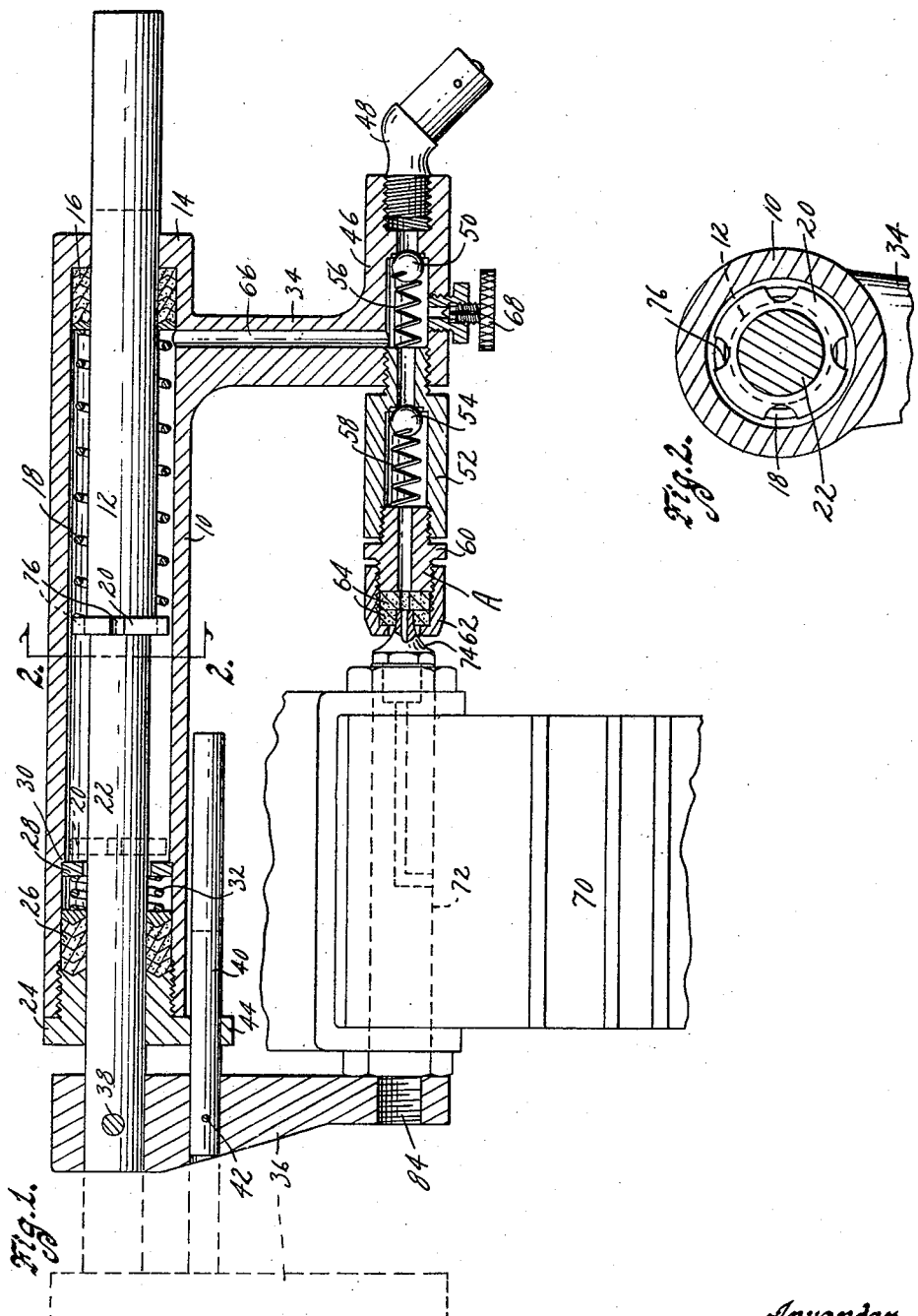
Witness
H. S. Wenzenwaier
Inventor
George H. Hartman
By Bair, Freeman & Sinclair
Attorneys June 6, 1933.   G. H. HARTMAN   1,912,770
LUBRICANT FITTING CLAMP
Filed Sept. 14, 1931   2 Sheets-Sheet 2
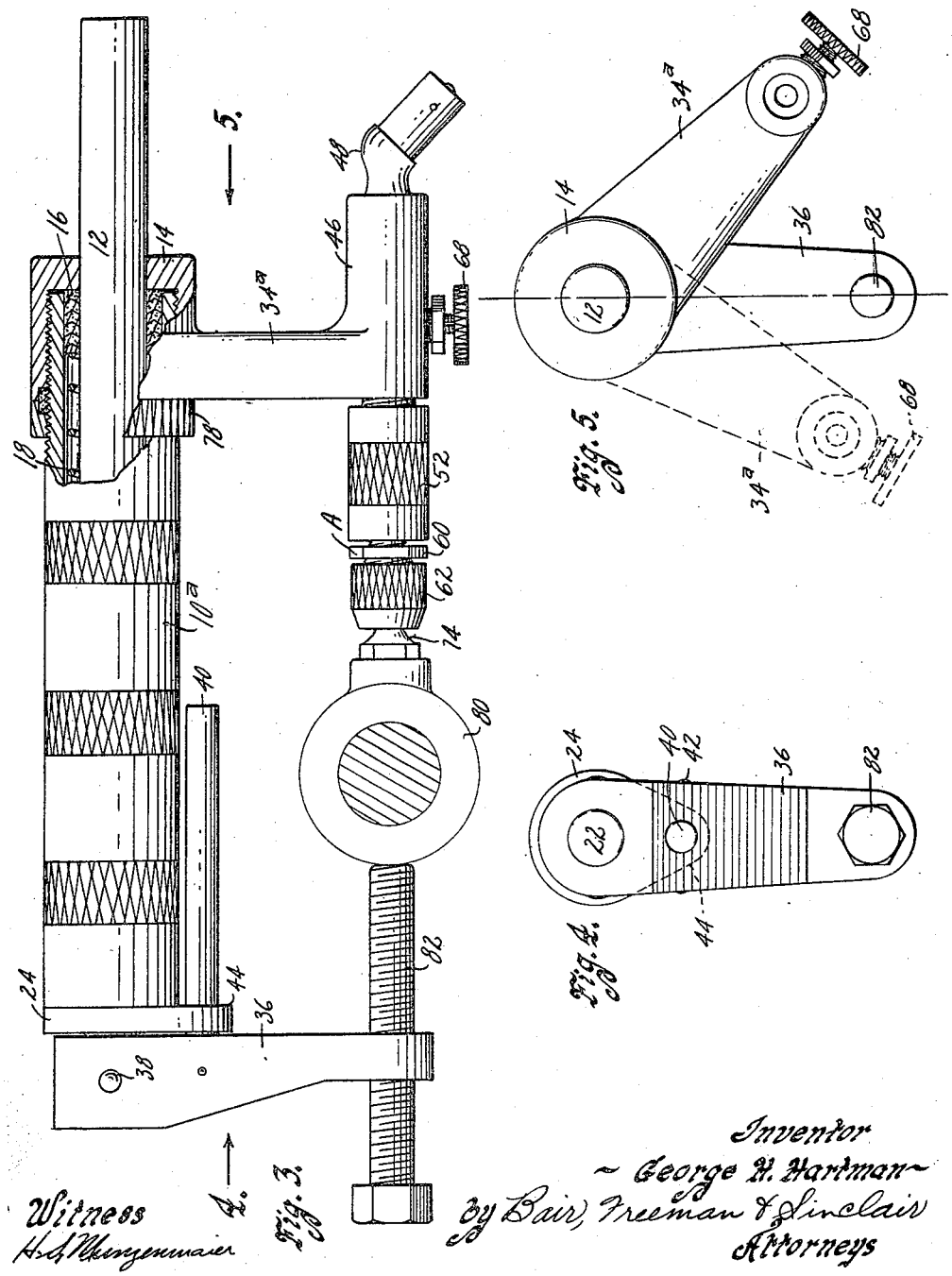
Inventor
George H. Hartman
By Bair, Freeman & Sinclair
Attorneys
Witness
H. S. Mangenmaier Patented June 6, 1933

1,912,770

UNITED STATES PATENT OFFICE

GEORGE H. HARTMAN, OF BRYAN, OHIO, ASSIGNOR TO THE ARO EQUIPMENT CORPORATION, OF BRYAN, OHIO, A CORPORATION OF OHIO

LUBRICANT FITTING CLAMP

Application filed September 14, 1931. Serial No. 562,734.

The object of my invention is to provide a lubricant fitting clamp, which is simple, durable and comparatively inexpensive to manufacture.

A further object of my invention is to provide a lubricant fitting clamp wherein a lubricant fitting engagement member is provided for engaging a contact type of lubricant fitting, and pressure operating means is provided for engaging a part rigid with the lubricant fitting, whereby to tighten such engagement without having to manually hold the lubricant fitting engagement member in contact with the lubricant fitting against the tendency of lubricant under high pressure to separate the engaging parts.

More particularly, it is my object to provide a cylinder and a piston with laterally extending arms, one of which carries a lubricant fitting engagement member and the other being adapted for engaging a part rigid with a lubricant fitting, fluid pressure being supplied to the cylinder for tightening the engagement.

A further object is to provide a check valve arrangement for lubricant under pressure to flow through to a lubricant fitting engagement member with a by-pass passageway from the intake side of the check valve to the cylinder, so that the lubricant under pressure itself first tends to tighten the engagement of the clamp with the lubricant fitting and the part rigid therewith, after which the check valve is opened by the lubricant pressure for discharging the lubricant into the lubricant fitting.

Still another object is to provide a spring return and a release valve, so that when the release valve is open, the spring return will loosen the clamp until the release valve is again closed.

A further object is to provide a clamp for a lubricant fitting, which has a bayonet or other type of positive connection for a grease gun or the like, and which is adapted to coact with a contact type of lubricant fitting, the device having inherent means for tightening such contact without the necessity of manually maintaining the contact.

With these and other objects in view, my invention consists in the construction, arrangement and combination of the various parts of my lubricant fitting clamp, whereby the objects contemplated are attained, as hereinafter more fully set forth, pointed out in my claims, and illustrated in the accompanying drawings, in which:

Figure 1 is a longitudinal sectional view through a lubricant fitting clamp embodying my invention and showing it cooperating with a lubricant fitting.

Figure 2 is an enlarged, sectional view on the line 2—2 of Figure 1.

Figure 3 is a side elevation of a modified form of construction, parts being broken away and other parts being shown in section.

Figure 4 is an end view in the direction of the arrow 4 adjacent Figure 3; and

Figure 5 is an end view in the direction of the arrow 5 adjacent Figure 3.

In the accompanying drawings, I have used the reference numeral 10 to indicate a cylinder. A plunger-like piston 12 is reciprocable relative to the cylinder 10 through a head 14 thereof. The plunger-like piston 12 is packed relative to the cylinder 10 by means of packing 16. A return spring 18 is interposed between the packing 16 and a shoulder 20 on the piston, which besides serving as a return spring maintains the packing tight.

Extending from the plunger-like portion 12 is a piston rod 22 reciprocably mounted through a packing nut 24 in the end of the cylinder 10 opposite the head 14 thereof. Packing 26 is provided surrounding the piston rod 22 and contacting with the packing nut 24. A packing washer 28 against a shoulder 30 of the cylinder 10 is provided. Interposed between the washer 28 and the packing 26 is a spring 32 for maintaining the packing 26 tight.

Arms 34 and 36 extend laterally from the cylinder 10 and the piston rod 22 respectively.

The arm 34 may be formed integral with the cylinder 10 (as shown in Figure 1) or separate therefrom (as shown in Figure 3).

The arm 36 may be pinned or otherwise secured to the piston rod 22 as indicated at 38.

To prevent rotation of the piston rod 22 and consequent misalignment of the arms 34 and 36, I provide an alignment rod 40. The rod 40 is pinned at 42 in the arm 36 and is slidably mounted through a lug 44 of the packing nut 24.

The arm 34 is provided with a hub 46 with which a bayonet or other positive type of lubricant fitting 48 is connected. The lubricant fitting 48 is adapted to have the discharge end of a grease gun or other means for supplying lubricant under pressure connected therewith.

Within the hub 46 a check valve 50 is provided. An intermediate fitting 52 is connected with the hub 46 by means of a screw-threaded connection. The fitting 52 houses a second check valve 54. Springs 56 and 58 serve to normally maintain the check valves 50 and 54 in closed position.

A lubricant fitting engagement member A is connected with the intermediate fitting 52. It comprises a primary portion 60, a cap 62 and gasket washers 64.

A passageway 66 in the arm 34 communicates with the interior of the cylinder 10 and the space between the check valves 50 and 54. A release valve 68 also communicates with this space.

In Figure 1, I have shown an automobile spring 70, having a shackle bolt 72 and a contact type of lubricant fitting 74. My lubricant fitting clamp is shown applied thereto by way of illustration.

Practical operation

In the operation of the lubricant fitting clamp, the parts normally assume the dotted line position shown in Figure 1, due to the action of the return spring 18. The operator places the lubricant fitting engagement member A against the lubricant fitting 74 and then starts operation of the lubricant gun.

The lubricant under pressure is driven through the check valve 50 and at first is held by the check valve 54 and passes through the passageway 66 to the cylinder 10. It passes freely through notches 76 of the shoulder 20 and displaces the piston 12, causing movement of the piston toward the right to the full line position.

After the arm 36 engages the shackle bolt 72, such engagement and the engagement of the lubricant fitting engagement member A with the lubricant fitting 74 tightens until the lubricant pressure overcomes the tension of the spring 58, whereupon lubricant under pressure is forced into the fitting 74. The higher the pressure required to force the lubricant into the fitting, the higher will be the pressure imparted to the cylinder 10 for maintaining the clamp in tightly clamped position on the shackle bolt.

After the shackle bolt has been properly lubricated, and the operation of the lubricant gun stopped, the lubricant fitting clamp may be released from the shackle bolt by slightly unscrewing the release valve 68 which allows some of the grease trapped in the cylinder 10 to be forced out to atmosphere by the spring 18.

This operation preferably is continued until the member A can be disengaged from the fitting 74.

It will be noted that the respective areas of the piston 12 and the piston rod 22 are approximately the same (see Figure 2). This is because not much piston area is required for proper tightening of the clamp on the lubricant fitting, and yet considerable strength is needed in the piston rod in order to prevent bending thereof, as the arms 34 and 36 are forced toward each other.

A modified form of construction is shown in Figure 3 in which the cylinder 10a and the arm 34a are made separate from each other with a screw-threaded engagement. By means of a lock nut 78, the arm 34a may be held rigid in any position with respect to the cylinder 10a.

In Figure 5, the arm is shown solid in one position and dotted in another position. Such adjustment is desirable where the lubricant fitting and the part rigid therewith are not in alignment.

There is considerable distance between the arm 36 and the member A, but this can be reduced on certain types of bearings, such as the one shown at 80 in Figure 3. This is accomplished by a set screw 82 in a threaded opening 84 of the arm 36. By this arrangement, the lubricant fitting clamp can be adjusted for bearing lubricant work on various types of bearings.

Thus a lubricant fitting clamp is provided in which there is no necessity for wrenches or screw-threaded tightening adjustments inasmuch as the lubricant pressure itself serves to automatically tighten the clamp. The operation of the clamp therefore depends upon the operation of the grease gun.

My invention effectively provides a clamp which entirely eliminates the unsatisfactory method of trying to keep a lubricant gun in contact with a contact type of lubricant fitting by hand.

Some changes may be made in the arrangement and construction of the various parts of my lubricant fitting clamp without departing from the real spirit and purpose of my invention, and it is my intention to cover by my claims, any modified forms of structure or use of mechanical equivalents, which may be reasonably included within their scope.

I claim as my invention:

1. In a lubricant fitting clamp, a cylinder, a piston therein, a piston rod extending from said cylinder, laterally extending arms on the cylinder and the piston rod, a lubricant fitting engagement member on one of said arms, said arm having a passageway leading therethrough to said lubricant fitting engagement member, a pair of check valves in said passageway opening toward said lubricant fitting engagement member, said arm having a lubricant passageway leading from between said check valves to said cylinder.

2. In a lubricant fitting clamp, a cylinder, a piston therein, a piston rod extending from said cylinder, laterally extending arms on the cylinder and the piston rod, a lubricant fitting engagement member on one of said arms, means for supplying lubricant under pressure to said lubricant fitting engagement member, and means for supplying fluid pressure to said cylinder to cause movement of said arms toward each other.

3. In a lubricant fitting clamp, a cylinder, a piston therein, a piston rod extending from said cylinder, laterally extending arms on the cylinder and the piston rod, a lubricant fitting engagement member on one of said arms, means for supplying lubricant under pressure to said lubricant fitting engagement member, and means for supplying fluid pressure to said cylinder to cause movement of said arms toward each other.

4. In a lubricant fitting clamp, a cylinder, a piston therein, a piston rod extending from said cylinder, laterally extending arms on the cylinder and the piston rod, a lubricant fitting engagement member on one of said arms, a check valve, means for supplying lubricant under pressure to said lubricant fitting engagement member through said check valve, and means for supplying fluid pressure to said cylinder to cause movement of said arms toward each other.

5. In a lubricant fitting clamp, a cylinder, a piston therein, a piston rod extending from said cylinder, laterally extending arms on the cylinder and the piston rod, a lubricant fitting engagement member on one of said arms, a check valve, means for supplying lubricant under pressure to said lubricant fitting engagement member through said check valve and to said cylinder to cause movement of said piston therein in a direction to force said arms toward each other.

6. In a lubricant fitting clamp, a cylinder, a piston therein, a piston rod extending from said cylinder, laterally extending arms on the cylinder and the piston rod, a lubricant fitting engagement member on one of said arms, means for supplying lubricant under pressure to said lubricant fitting engagement member, means for supplying fluid pressure to said cylinder, and means for releasing such fluid pressure therefrom.

7. In a lubricant fitting clamp, a cylinder, a piston therein, a piston rod extending from said cylinder, means on said cylinder and on said piston rod to engage a lubricant fitting and a part rigid therewith, a pair of check valves, means for supplying lubricant under pressure to said lubricant fitting through said check valves, and means for supplying such lubricant under pressure from between said check valves to said cylinder.

8. In a lubricant fitting clamp, a cylinder, a piston therein, a piston rod extending from said cylinder, means on said cylinder and on said piston rod to engage a lubricant fitting and a part rigid therewith, a pair of check valves, means for supplying lubricant under pressure to said lubricant fitting through said check valves, means for supplying such lubricant under pressure from between said check valves to said cylinder, and a release valve communicating with between said check valves.

9. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto and means for discharging fluid pressure into said cylinder to tighten such engagement.

10. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto, means for supplying lubricant under pressure to said lubricant fitting and means for supplying fluid pressure to said cylinder for tightening such engagement.

11. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto, a check valve, means for supplying lubricant under pressure to said cylinder for tightening said engagement and means for supplying fluid pressure through said check valve to said lubricant fitting.

12. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto, a pair of check valves, and means for supplying lubricant under pressure from between said check valves to said cylinder for tightening such engagement and through both of said check valves to said lubricant fitting.

13. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto, a check valve, means for supplying lubricant under pressure to said cylinder for tightening said engagement, means for supplying lubricant under pressure through said check valve to said lubricant fitting, and a manually controlled valve for releasing such lubricant under pressure from said cylinder to loosen such engagement.

14. In a lubricant fitting clamp, a cylinder, a plunger-like piston extending from and packed relative to one end thereof, a piston rod extending from and packed relative to the other end thereof, means on said cylinder and piston rod to engage a lubricant fitting and a part rigid relative thereto, a pair of check valves, means for supplying lubricant under pressure from between said check valves to said cylinder for tightening such engagement and through both of said check valves to said lubricant fitting, and a release valve communicating with said cylinder.

Des Moines, Iowa, August 18, 1931.

GEORGE H. HARTMAN.